Figure 1:
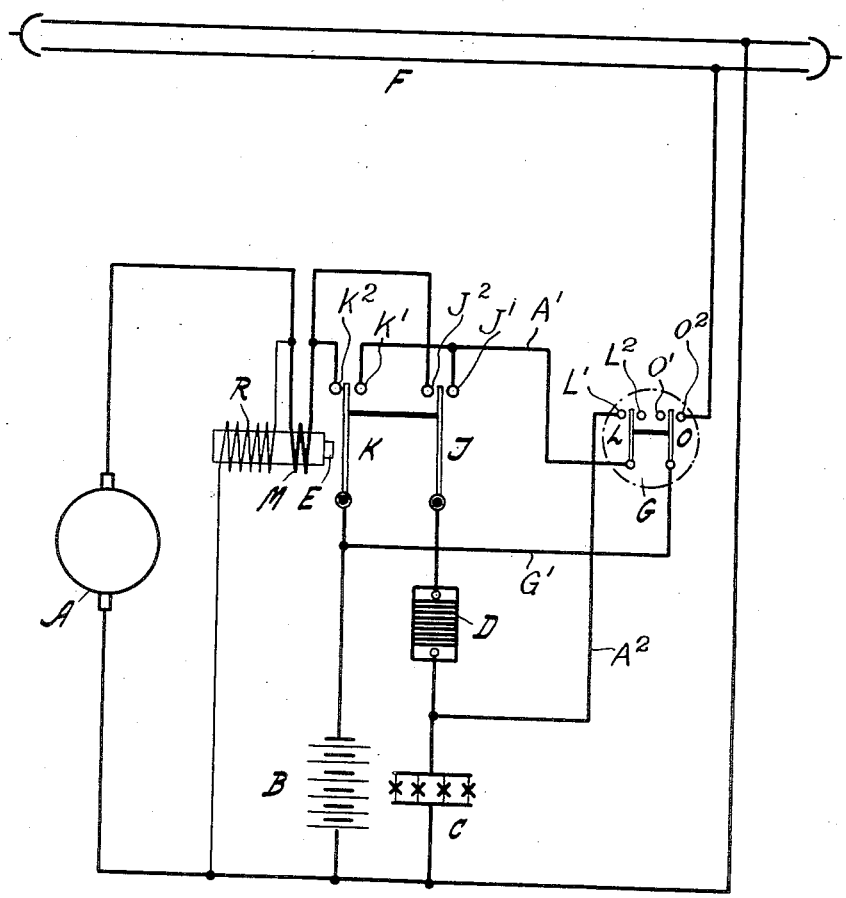

Oct. 14, 1930.  H. GROB  1,778,026
CONNECTION SYSTEM FOR TRAIN LIGHTING PLANTS CONNECTED IN PARALLEL
Filed April 20, 1927   2 Sheets-Sheet 1

Inventor:
Hugo Grob
Robert L. Blair, Attorney.

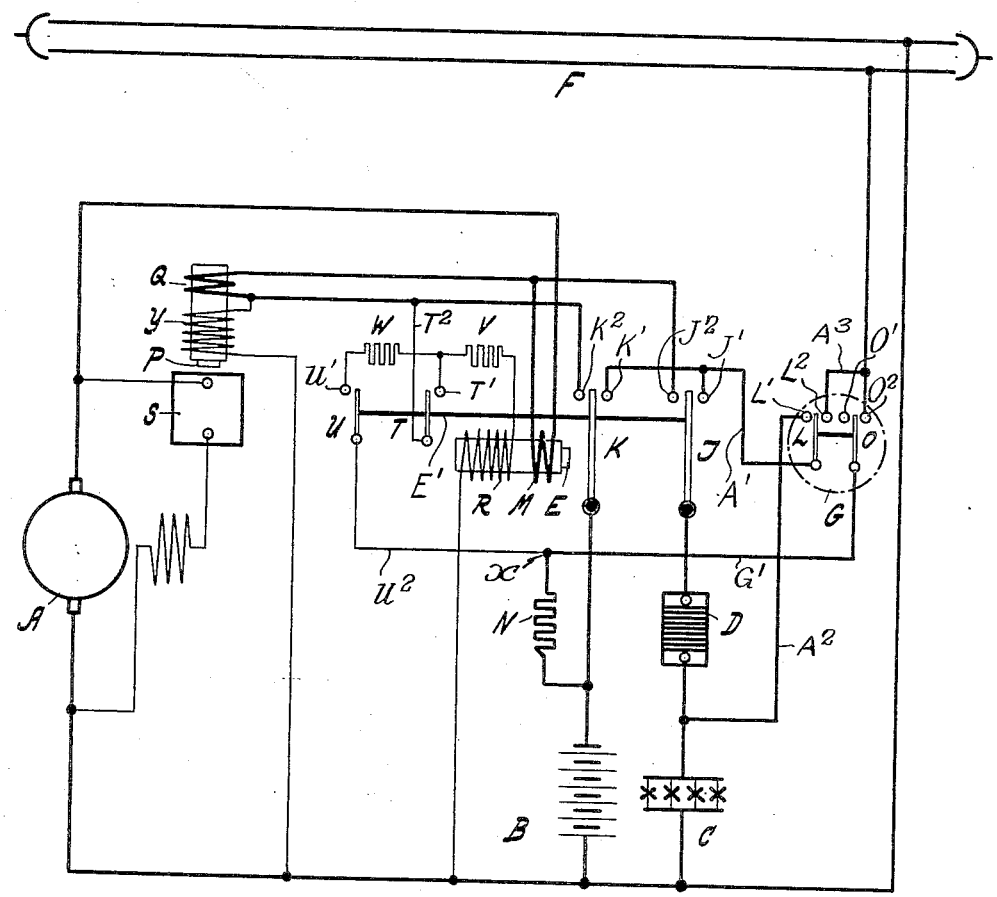

Patented Oct. 14, 1930

1,778,026

UNITED STATES PATENT OFFICE

HUGO GROB, OF BERLIN, GERMANY

CONNECTION SYSTEM FOR TRAIN-LIGHTING PLANTS CONNECTED IN PARALLEL

Application filed April 20, 1927, Serial No. 185,221, and in Germany April 24, 1926.

This invention relates to train lighting systems. In such systems it is desirable that the individual generating and lighting equipments of the several cars of a train be capable of being connected in parallel, in order that, in case of failure of the generating equipment or other mechanism on one car, the car thus affected may be supplied with current from other cars of the train.

In certain types of car lighting equipment, an automatic voltage regulator is employed to maintain the voltage across the lamps substantially constant and at a predetermined value for efficient operation of the lamps. These voltage regulators ordinarily include a variable resistance device which is inserted in the lamp circuit and suitably controlled by a voltage coil or coils so that it continually absorbs such energy that a constant voltage is maintained across the lamps. Generally speaking it is not feasible to connect in parallel generating systems which are regulated to a constant voltage. Even slight differences in the voltage between the generating equipment of two separate cars is apt to cause an unequal distribution of the load, and possibly an overloading of one or the other of the generators.

It is, however, feasible to connect in parallel the batteries of the several cars of the train by means of a common connection wire or connecting mains passing through the train, the batteries being connected in parallel across such mains. It is practicable to thus connect the batteries since the batteries are not ordinarily regulated to constant voltage.

In many car lighting systems, the variable resistance placed in the circuit of the lamps or lighting network, to control the voltage across the lamps, consists of a carbon pile which is subjected to a varying pressure in order to vary its resistance. The resistance of such a device, however, cannot be reduced to zero. For this reason it is desirable that the resistance device in the lamp circuit be short-circuited when the train is stationary or running at low speed and the lamps are consequently being fed by the storage battery. Such short-circuiting of this resistance makes it possible to employ the full voltage of the battery which, at any rate, is generally somewhat low.

If, however, the batteries of the individual cars are connected in parallel, a difficulty is encountered if the lamp circuit resistance is short-circuited when the generator of the car is idle. If the generator of a car is for any reason rendered inoperative or defective, the lamps of that car remain directly connected to the battery while the train is running, as well as while it is standing still. The battery is connected in parallel with the other batteries of the train, and these latter, during movement of the train, attain the charging voltage of their individual generators. This charging voltage is higher than the lighting voltage and, being thus impressed directly across the lamp circuit of the car having the defective equipment, the lamp circuit resistance of this car having been short-circuited, the excessive voltage would in a short time burn out the lamps.

Accordingly, it was hitherto necessary to allow the resistance to remain in the lamp circuit continually, if the car batteries were to be connected in parallel, and consequently the full battery voltage could not be utilized across the lamps when the train was stationary.

It is an object of the present invention to provide a system in which, when the batteries of the individual cars are not connected in parallel, the resistance in the lighting circuit is rendered ineffective when the train stops or the generator ceases to function, and in which, when parallel connection of batteries of the individual cars is employed, the voltage regulation of the lamps in each car is retained. Other objects of the invention will be in part obvious or in part pointed out hereinafter.

The invention is illustrated by way of example in the accompanying drawings in which, Figure 1 shows diagrammatically one possible embodiment of certain features of the invention, and Figure 2 shows diagrammatically another embodiment having features not included in the embodiment of Figure 1.

Similar reference characters refer to similar parts in both views of the drawings.

Referring to Figure 1 of the drawings, there is shown at A the commutator of a generator which is driven at varying speed, for example, from an axle of the railroad car. Adapted to be charged by the generator is a storage battery B, and C represents the lamps or lighting network of the car. A voltage regulator is provided for maintaining substantially constant the voltage across the lamps C, and includes a variable resistance D connected in the lamp circuit and taking the form of a carbon pile. This regulating apparatus is not shown in detail since it may take any of various well-known forms. The regulating coil (not shown) is connected across the lamp circuit and acts upon suitable mechanism to vary the compression of the carbon pile D so as to control the resistance thereof in a manner to maintain the voltage across the lamps substantially constant.

An automatic switch K—J is provided for controlling the connection of the generator with the circuit of the storage battery and lamps. The switch is operated by an electromagnet E which is provided with a voltage coil R connected across the generator terminals, and also with a current coil M. This automatic switch is adapted to connect the battery B and the lamps C with the generator upon the generator voltage building up to a predetermined value, and is adapted to open to break this connection when the generator voltage drops below this predetermined value. The mains F represent a connection line which passes through the train from one car to another for connecting the batteries of individual cars in parallel. The switch G is adapted for connecting the equipment shown herein with the connection mains F.

When the train is stationary, or when the generator is inoperative or turning very slowly, the magnet E has released its armature, and the two switch levers K and J are in a position inclined toward the right, the lever K engaging a contact $K^1$ and the lever J engaging a contact $J^1$. In this position of the automatic switch, the generator is disconnected. If the levers L and O of the switch G are inclined to the left, the lever L engaging a contact $L^1$ and the lever O engaging a contact $O^1$, the battery B is connected directly with the lamps C, the resistance D being short-circuited by way of the wires $A^1$ and $A^2$ and the switch lever L. If, on the other hand, the switch G is inclined toward the right so that the battery B is connected to the mains F, the lever O engaging a contact $O^2$ and the lever L engaging a contact $L^2$, the short-circuiting means is rendered ineffective and the resistance D remains effective to regulate the lamp voltage during the period that the train is at rest or the generator A is otherwise inoperative.

Thus, when the battery B is connected across the mains F by the switch G, the lamps C are protected against any increases in voltage which may be impressed across the mains F. On the other hand, if the switch G is open so that the battery is not connected across the mains F, the resistance D is short-circuited whenever the generator is inoperative or generating a voltage too low to close the automatic switch K—J.

When the train now starts up and the generator voltage builds up, the magnet E attracts the armature and the automatic switch K—J swings to the left, the lever K engaging a contact $K^2$ and the lever J engaging a contact $J^2$. The generator is now connected to charge the storage battery and to supply current to the lamps through the regulating resistance D. In this state of operation, the short-circuiting wire $A^1$—$A^2$ is rendered ineffective regardless of the position of the switch G, the connection between the automatic switch lever K and the contact $K^1$ being broken when the switch K—J is attracted by the magnet E.

The current coil M of the magnet E is adapted to cause the automatic switch to open, or move to the right, immediately upon a return current flowing from the battery to the generator and resulting from a decrease in generator voltage below the battery voltage. When the switch G is thrown to the right, so as to connect the battery B with the parallel connection mains F, there is a possibility, particularly if the individual generators of the different cars are of different construction, that the voltages will not be identical, and that a return current will flow from the mains F back to the generator A and cause the generator to be disconnected by the agency of the coil M, when the generator is operating normally, and such disconnection is not desired.

Referring now to Figure 2, there is shown inserted in the lead $G^1$ from the switch lever O to the battery circuit, a resistance N. In the embodiment shown in Figure 2, the contact $L^2$ of the switch G is connected by a wire $A^3$ with the parallel connection mains F. When the automatic switch K—J is closed or moved to the left and the generator A is generating a suitable charging voltage, and when the switch G is inclined to the right to connect the battery B with the mains F, the resistance N is effective to cut down any current flow back toward the generator through the lead $G^1$ from the mains F. When the generator A slows down or becomes inoperative, so as to permit the switch K—J to move to the right and the lever K to come into engagement with the contact $K^1$, the switch lever L being in engagement with the contact $L^2$, the resistance N is rendered ineffective against current tending to flow from the mains F, by being short-circuited through the leads A³ and A¹. Thus, the resistance N counteracts the possibility of the automatic switch being open while the generator A is properly functioning, but immediately upon the generator voltage dropping and the automatic switch opening, the resistance N is rendered ineffective and does not interfere with a supply of current to the lamps C from the mains F.

In Figure 2 there is shown the voltage regulator for the generator A which is adapted to maintain the voltage of the generator substantially constant throughout varying speeds. This regulator comprises in substance a variable resistance device S which is positioned in the circuit of the generator field winding and is controlled by a magnet P. The magnet P is provided with a voltage coil Y connected across the generator and also with a current coil Q which is inserted in the lead from the generator to the battery. The coil Q, supplied with current by the output of the generator, assists the action of the voltage coil Y and is adapted to aid in reducing the generator voltage as current flows therethrough from the generator toward the battery. Also, when current tends to flow through the coil Q in a direction toward the generator, the coil Q opposes the voltage coil Y and tends to cause an increase in the generator voltage to counteract such current flow.

In addition to the above, there is shown in Figure 2 a mechanism which decreases the sensitiveness of the magnet E of the automatic switch upon a tendency of current to flow back from the mains F toward the generator A. The automatic switch is provided with two additional switch levers T and U connected, for example, by a link E¹ to swing with the switch levers K and J. The voltage coil R of the automatic switch is connected through a resistance V to a contact T¹ and through a second resistance W to a contact U¹. When the generator voltage drops and the automatic switch swings to the right, the switch lever T engages the contact T¹, and the voltage coil R is connected through the lead T² across the generator, and is responsive to the voltage of the generator. When the generator is operating normally and the automatic switch is closed, being moved to the left, the switch lever U engages the contact U¹ and the coil R is connected by the lead U² to the lead G¹. The connection with the lead G¹ is between the resistance N and the main F, and hence the coil R is now directly responsive to the voltage across the mains F. The resistance W effects a weakening of the effect of the coil R upon the magnet E which is necessary to permit release of the armature of the magnet E when the voltage of the generator A drops again.

Thus, the voltage coil R of the automatic switch is made responsive to generator voltage when the automatic switch is open and is made responsibe to the voltage of the mains F when the automatic switch is closed and the generator is operating normally. Because of the direct connection of the coil R across the mains F, while the generator is operating normally, the greater the increase in voltage across the line F the greater becomes the holding force exerted by the coil R and this thus counteracts the tendency of a return current flowing through the coil M to open the automatic switch and disconnect the generator. Therefore, during movement of the train and normal operation of the generator A, the automatic switch is prevented from being opened by an excess of voltage in the parallel connection mains F.

In view of the foregoing, it will be clear how to practice my invention, but as conducive to a clearer understanding of certain features thereof, it might be at this point noted how the different conditions of practical use are met with in the operation of the system. Considering first the switch G as swung over toward the left so that the train line F is disconnected from the system in the car and considering the generator A to be at rest or operating below the critical voltage, the switch arms U, T, K and J will be in a position toward the right and hence the storage battery B alone can supply energy to the lamps C, the lamp regulator D being short-circuited by the switch arms J and L. Thus there will be no loss of battery voltage through the regulating resistance D. The voltage coil R on the main switch will be connected through the switch arm T and contact T¹ directly across the generator by through the resistance V and assuming now that the generator, due to an increase in speed of the vehicle, for example, achieves a voltage sufficient to cause the coil R when thus connected to operate the switch levers, the switch arms U, T, K and J are swung over the left; it will be understood, of course, that the voltage at which the coil R thus actuates these parts is greater than the battery voltage B since it is necessary for the generator A to commence charging of the storage battery. In this position the switch arm T disconnects the voltage coil R from its above-mentioned circuit and by way of the switch arm U the coil R is now connected from one side of the generator, thence through the coil R through resistances V and W and by way of switch arm U and conductor U² to the point X, and thence through resistance N to the other side of the generator. There being at this time no substantial current flow through the resistance N, the effect of the latter is negligible. The coil R is thus substantially weakened but the subsequent flow of current from the generator to the battery and/or the lamps through the coil M assists the coil R in holding the switch arms in their position inclined toward the left. The charging of the battery or the supply of current to the lamps by the generator can then proceed, but the switch arms J and K no longer short-circuit the lamp regulator resistance D but have been effective in causing the latter to be inserted in circuit with the lamps C so that the higher voltage of the system, due to the generator, will not be impressed upon the lamps C. The coil Q will be seen to be connected in the branch that supplies current to the battery B and it acts to aid the regulating coil Y and prevents the charging current to the battery from being too high. Should the generator slow down sufficiently or stop the battery B will tend to discharge through the generator and hence through the coil M, the effect of which coil is thus reversed; the switch arms U, T, K and J are thus released and moved to the right, it being noted that a much smaller reverse current through the coil M is necessary to effect this disconnection of the generator, due to the weakened condition of the coil R.

Assuming, however, that the generator continues in operation at a speed sufficient to charge the battery B and supply current to the lamps C, as above noted, and assuming that the switch G is moved to the right so that the system of the vehicle is connected to the train line F, the system is fully protected from undesirable interference therewith by other systems or generators of other vehicles that may be connected to the train line F. Assuming, for example, that another generator connected to the train line F has a higher voltage than the generator A so that this other generator tends to force current into the system, it is first to be noted that the train line has to affect the system through the switch arm O, the conductor $G^1$ and through the resistance N; in so doing, however, the current flow from the train line has in effect to maintain raising the potential of the point X if any current is to be forced into the battery B, and in raising the potential of the point X the strength of the coil R is increased. Should the potential of the current thus forced into the battery from the train line be sufficient to tend to force a current through the switch arm K and thence through the coils Q and M into the generator A, the resultant current through the coil Q flows in reversed direction and its effect on the coil Y of the regulator is also reversed. The regulator is thus caused to increase the voltage of the generator A and thus promptly counteract the tendency of the train line to force current into the generator. During this action the current flow through the coil M is also momentarily reversed but the coil R having been strengthened, due to the raising of the potential of the point X, the coil R thus holds the switch arms U, T, K and J in position to the left for this reversal of current in the coil M is thus insufficient to cause the magnet E to release the switch arms so they can move to the right. Thus the generator A is held connected to its system as long as it is in operative condition. It is to be noted, however, that any tendency of the train line F to supply current to the system has to be exerted through the resistance N and that hence the voltage of the train line has to be considerably greater than that of the generator A, while on the other hand, should the voltage of the generator A be materially higher than that of the train line F, the generator A would have to supply the train line through the resistance N. In each instance the resistance N thus effects such an IR drop that undue interference of one generator or system upon another generator or system connected to the train line F is eliminated.

Should the generator A slow down sufficiently or come to a stop, the switch arms including arms K and J move to the right but in so doing they are prevented from short-circuiting the regulator resistance D, due to the fact that the arm L of the switch G is in contact with the switch contact $L^2$, while the battery B will be connected directly through switch arms K and L to the train line F so that it may supply current thereto, it being understood that if the stoppage of the generator A is due to the stoppage of the train, the other generators, if any, connected to the train line F, will, of course, also be at rest.

Should the generator A, however, become inoperative due, for example, to burning out of its armature or due to the blowing of a fuse, the subsequent starting of the train, finding the parts in the positions immediately above outlined, does not result in movement of the switch arms U, T, K and J to the left because the coil R remains unenergized due to the inoperativeness of the generator A. Other generators, however, that may be connected to the train line F can, nevertheless, supply charging current to the battery B through the switch arms L and K, both in their right-hand position, it being noted that the resistance N is cut out of such a charging circuit while at the same time the lamps C are effectively safeguarded against the voltage of such other generator or generators or against the voltage of the battery B being thus charged because the resistance D is maintained in the circuit of the lamps C, due to switch arms K, J and L being in right-hand position.

As many possible embodiments may be made of the above invention and as many changes might be made in the embodiments above set forth, it is to be understood that all matter hereinbefore set forth or shown in the accompanying drawings is to be interpreted as illustrative and not in a limiting sense.

What I claim as new and desire to secure by Letters Patent is:

1. In a train lighting system, in combination with a connection main passing through the train, a generator, a circuit adapted to be fed by said generator including a storage battery and lamps, an automatic switch adapted upon said generator attaining a predetermined output to connect said generator to supply said circuit and adapted upon the generator output falling below said predetermined value to break said connection, a regulator adapted to maintain the voltage across the lamps substantially constant and including a variable resistance in the lamp circuit, means responsive to movement of said automatic switch to disconnect said generator adapted to short-circuit said resistance, a switch for connecting said battery with the connection main, and means adapted when said last switch is closed to render ineffective said short-circuiting means.

2. In a train lighting system, in combination with a connection main passing through the train, a generator, a circuit adapted to be fed by said generator including a storage battery and lamps, an automatic switch adapted upon said generator attaining a predetermined output to connect said generator to supply said circuit and adapted upon the generator output falling below said predetermined value to break said connection, a regulator adapted to maintain the voltage across the lamps substantially constant and including a variable resistance in the lamp circuit, a lead for short-circuiting said resistance, said automatic switch including a pair of contacts in said lead and adapted to close when said switch moves to disconnect said generator thereby to render said short-circuiting lead effective, and a switch for connecting said battery to said connection main, said last switch including a pair of contacts adapted to open when said battery is connected with said main and thereby break said short-circuiting lead, said pair of contacts being adapted to close when said switch is moved to disconnect said battery from said main.

3. In a train lighting system, in combination with a connection main passing through the train, a generator, a circuit adapted to be fed by said generator including a storage battery and lamps, an automatic switch adapted upon said generator attaining a predetermined output to connect said generator to supply said circuit and adapted upon the generator output falling below said predetermined value to break said connection, a regulator adapted to maintain the voltage across the lamps substantially constant and including a variable resistance in the lamp circuit, means for short-circuiting said resistance when said automatic switch is open, a switch for connecting said battery with the connection main, a second resistance interposed between said last switch and said battery, and means adapted to render said second resistance ineffective when said automatic switch is open.

4. In a train lighting system, in combination with a connection main passing through the train, a generator, a circuit adapted to be fed by said generator including a storage battery and lamps, an automatic switch adapted upon said generator attaining a predetermined output to connect said generator to supply said circuit and adapted upon the generator output falling below said predetermined value to break said connection, a regulator adapted to maintain the voltage across the lamps substantially constant and including a variable resistance in the lamp circuit, means for short-circuiting said resistance when said automatic switch is open, a switch for connecting said battery with the connection main, means adapted to render said short-circuiting means ineffective when said last switch is closed, a resistance interposed between said connection main and said battery circuit, and means adapted to short-circuit said last resistance when said automatic switch is open.

5. In a train lighting system, in combination with a connection main passing through the train, a generator, a circuit adapted to be fed by said generator including a storage battery and lamps, an automatic switch adapted upon said generator attaining a predetermined output to connect said generator to supply said circuit and adapted upon the generator output falling below said predetermined value to break said connection, a regulator adapted to maintain the voltage across the lamps substantially constant and including a variable resistance in the lamp circuit, means for short-circuiting said resistance when said automatic switch is open, a switch for connecting said battery with the connection main, said automatic switch including a voltage coil tending to close the switch, and means adapted to connect said coil across the generator terminals when said automatic switch is open and adapted to connect said coil across said connection main when said automatic switch is closed.

6. In a train lighting system, in combination with a connection main passing through the train, a generator, a circuit adapted to be fed by said generator including a storage battery and lamps, an automatic switch adapted upon said generator attaining a predetermined output to connect said generator to supply said circuit and adapted upon the generator output falling below said predetermined value to break said connection, a regulator adapted to maintain the voltage across the lamps substantially constant and including a variable resistance in the lamp circuit, means for short-circuiting said resistance when said automatic switch is open, a switch for connecting said battery with the connection main, a resistance interposed between said connection main and said battery circuit, means adapted to render said last resistance ineffective when said automatic switch is open, said automatic switch including a voltage coil tending to close the switch, and means adapted to connect said coil across the generator terminals when said automatic switch is open and adapted to connect said coil across said connector mains when said automatic switch is closed.

7. In a train lighting system, in combination, a train line, a generator, a circuit supplied by said generator, a resistance, a control resistance interposed between said generator and said circuit, and switching mechanism for connecting said generator to said train line through said first-mentioned resistance, switching mechanism for connecting said generator to said circuit, and means for cutting out said control resistance upon said generator being disconnected from said circuit and operative only when said first-mentioned switching mechanism is in circuit-opening position.

8. In a train lighting system, in combination, a train line, a generator, a translation circuit, a resistance interposed between said generator and said translation circuit, means adapted to connect said generator to said translation circuit and upon disconnection to substantially short-circuit said resistance, and means for connecting said generator to said train line adapted upon operation to prevent short-circuiting of said resistance.

9. In a train lighting system, in combination, a train line, a generator, a translation circuit, a resistance interposed between said generator and said translation circuit, means adapted to connect said generator to said translation circuit and upon disconnection to substantially short-circuit said resistance, a resistance, and means for interposing said last-mentioned resistance between said generator and said train line and adapted upon operation to prevent short-circuiting of said first-mentioned resistance.

10. In a train lighting system, in combination, a train line, a generator, a translation circuit, an automatic switch for connecting and disconnecting said generator relative to said circuit and including a reverse current coil, means for connecting said train line to said generator but on the side of said switch remote from said generator, and means for preventing reverse current in said coil due to current flow from said train line from disconnecting said generator.

11. In a train lighting system, in combination, a train line, a generator, a translation circuit, an automatic switch for connecting and disconnecting said generator relative to said circuit and including a reverse current coil, means for connecting said train line to said generator but on the side of said switch remote from said generator, and means causing an increase in generator voltage and responsive to reverse current flow through said coil from said train line to said generator.

12. In a train lighting system, in combination, a train line, a generator, a circuit including a storage battery and lamps adapted to be supplied from said generator or from said train line, a resistance interposed between said lamps and said storage battery, and means for making said resistance ineffective when both said generator and said train line are substantially ineffective to supply said circuit and for making said resistance effective when either said generator or said train line is effective to supply said circuit.

13. In a train lighting system, in combination, a train line, a generator, a translation circuit connected to said train line and to said generator, means for regulating the voltage of said generator, and means responsive to current flowing from said train line to said generator for causing said regulating means to increase the voltage of said generator.

14. In a train lighting system, in combination, a train line, a generator, a translation circuit connected to be supplied by both said train line and said generator, a resistance interposed between said train line and said generator so that current interchange therebetween takes place through said resistance, means for regulating the output of said generator, and means responsive to current flow in a direction from said train line toward said generator for causing said regulating means to increase the output of said generator.

In testimony whereof I have affixed my signature.

HUGO GROB.